United States Patent
Hwang et al.

(10) Patent No.: US 11,451,519 B2
(45) Date of Patent: Sep. 20, 2022

(54) ANONYMOUS CREDENTIAL AUTHENTICATION SYSTEM AND METHOD THEREOF

(71) Applicant: ELECTRONICS AND TELECOMMUNICATIONS RESEARCH INSTITUTE, Daejeon (KR)

(72) Inventors: Jung Yeon Hwang, Daejeon (KR); Seung-Hyun Kim, Daejeon (KR); Sung-Hoon Lee, Seoul (KR); Soo Hyung Kim, Daejeon (KR); Sangrae Cho, Daejeon (KR); Seok Hyun Kim, Daejeon (KR); Young Seob Cho, Daejeon (KR); Youngsam Kim, Daejeon (KR); Jong-Hyouk Noh, Daejeon (KR); Kwantae Cho, Daejeon (KR); Jin-Man Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/104,695

(22) Filed: Nov. 25, 2020

(65) Prior Publication Data

US 2021/0160223 A1 May 27, 2021

(30) Foreign Application Priority Data

Nov. 25, 2019 (KR) .................. 10-2019-0152716
Nov. 20, 2020 (KR) .................. 10-2020-0156208

(51) Int. Cl.
H04L 9/32 (2006.01)
G06F 21/45 (2013.01)
(Continued)

(52) U.S. Cl.
CPC .......... *H04L 63/0421* (2013.01); *G06F 21/45* (2013.01); *H04L 9/30* (2013.01);
(Continued)

(58) Field of Classification Search
CPC ..... H04L 63/0421; H04L 9/30; H04L 9/3218; H04L 63/0884; H04L 63/123; H04L 9/08;
(Continued)

(56) References Cited

U.S. PATENT DOCUMENTS 8,060,914 B2   11/2011  Zeng
8,499,158 B2    7/2013  Lee et al.
(Continued)

FOREIGN PATENT DOCUMENTS

JP    4704406    6/2011
JP    5532048    6/2014
(Continued)

OTHER PUBLICATIONS

Maheswaran. Building Privacy-Preserving Cryptographic Credentials from Federated Online Identities. N.p. Web. (Year: 2016).*
(Continued)

*Primary Examiner* — Techane Gergiso
(74) *Attorney, Agent, or Firm* — Kile Park Reed & Houtteman PLLC

(57) ABSTRACT

An anonymous credential authentication system receives an anonymous credential signature value indicating that setting proposition information using a credential is satisfied from a user device that has been issued the credential combined with multiple pieces of attribute information constituting personal information, generates signer authentication information that confirms a signer of the anonymous credential signature value using an opening key, and outputs the signer authentication information.

17 Claims, 9 Drawing Sheets

(51) Int. Cl.
*H04L 9/30* (2006.01)
*H04L 9/40* (2022.01)

(52) U.S. Cl.
CPC ........ *H04L 9/3218* (2013.01); *H04L 63/0884* (2013.01); *H04L 63/123* (2013.01)

(58) Field of Classification Search
CPC ....... H04L 29/06; H04L 9/32; H04L 2209/42; H04L 9/3247; H04L 9/3255; H04L 9/3263; H04L 63/08; H04L 63/0407; H04L 9/3221; G06F 21/45; G06F 21/6254; H04W 12/02; H04W 12/06; G06Q 20/383
See application file for complete search history.

(56) References Cited

U.S. PATENT DOCUMENTS

| | | | |
|---|---|---|---|
| 8,762,729 | B2 | 6/2014 | Hwang et al. |
| 8,949,609 | B2 | 2/2015 | Teranishi |
| 8,966,273 | B2 | 2/2015 | Hwang et al. |
| 9,258,130 | B2 | 2/2016 | Hwang et al. |
| 10,530,582 | B2* | 1/2020 | Hon ............... H04L 63/0442 |
| 10,735,205 | B1* | 8/2020 | Wentz .............. H04L 9/3257 |
| 2006/0155985 | A1* | 7/2006 | Canard ............ H04L 63/0823 713/156 |
| 2012/0060028 | A1* | 3/2012 | Furukawa ........... H04L 9/3218 713/156 |
| 2012/0124379 | A1* | 5/2012 | Teranishi ........... H04L 9/3249 713/175 |
| 2012/0159166 | A1* | 6/2012 | Lee ................. H04L 9/321 713/168 |
| 2013/0117824 | A1* | 5/2013 | Naslund ............ H04L 9/0841 726/4 |
| 2014/0359289 | A1* | 12/2014 | Camenisch ........ H04L 9/0866 713/168 |
| 2020/0169881 | A1* | 5/2020 | Linton ............... H04W 12/06 |

FOREIGN PATENT DOCUMENTS

| | | |
|---|---|---|
| KR | 10-1425552 | 8/2014 |
| KR | 10-1543711 | 8/2015 |

OTHER PUBLICATIONS

Bernhard, D., Fuchsbauer, G., Ghadafi, E. et al. Anonymous attestation with user-controlled linkability. Int. J. Inf. Secur. 12, 219-249 (2013). https://doi.org/10.1007/s10207-013-0191-z (Year: 2013).*

Jan Camenisch et al., "An Efficient System for Non-transferable Anonymous Credentials with Optional Anonymity Revocation", Advances in Cryptology—Eurocrypt, 2001, pp. 1-30.

Anna Lysyanskaya et al., "Pseudonym Systems", 2000, Howard Heys and Carlisle Adams (Eds.): SAC '99 LNCS 1758. pp. 184-199.

Ernie Brickell et al., "Direct Anonymous Attestation", Feb. 11, 2004, pp. 1-28.

David Chaum, "Some Weaknesses of "Weaknesses of Undeniable Signatures"", Advances in Cryptology—Eurocrypt, 1991, LNCS 547, pp. 554-556.

Jan Camenisch et al., "Signature Schemes and Anonymous Credentials from Bilinear Maps", Crypto, 2004, pp. 56-72.

* cited by examiner

ANONYMOUS CREDENTIAL AUTHENTICATION SYSTEM AND METHOD THEREOF

CROSS-REFERENCE TO RELATED APPLICATION

This application claims priority to and the benefit of Korean Patent Application Nos. 10-2019-0152716, and 10-2020-0156208 filed in the Korean Intellectual Property Office on Nov. 25, 2019, and Nov. 20, 2020, the entire contents of which are incorporated herein by reference.

BACKGROUND OF THE INVENTION

(a) Field of the Invention

The present invention relates to an anonymous credential authentication system and method thereof. More particularly, the present invention relates to an anonymous credential authentication system and method thereof that are capable of providing controllable anonymity and controllable linkability for anonymous credential signatures that prove qualification requirements without exposing the identity by using credential based on multiple pieces of attribute information constituting personal identification information.

(b) Description of the Related Art

As information technology (IT) services are becoming more intelligent and advanced in all areas of life, such as public, defense, medical, finance, autonomous driving, and infrastructure, an authentication method based on various user information is required. Conventional authentication techniques such as an ID/password authentication method, a real name-based public key infrastructure (PKI) authentication method, and an i-Pin method have many disadvantages on the privacy side, such as information exposure in the process of registering and verifying personal information, leakage due to excessive personal information and careless management of the service provider, and problems of extensive behavior tracking.

Various types of cryptographic authentication techniques, such as anonymous credential, direct anonymous attestation (DAA), and group signature methods are widely studied to solve these disadvantages and protect the privacy of users. These techniques are generally classified according to the controllable type of anonymity and linkability.

The anonymous credential technique is an anonymous authentication method that can prove multiple pieces of attribute information. A user who has been issued a credential including multiple pieces of attribute information enables partial hiding that can disclose only the attribute information necessary for the service among the multiple pieces of attribute information, and hide the rest of the multiple pieces of attribute information. The anonymous credential technique guarantees anonymity of the signer from the signature value, and when multiple signature values are given, provides unlinkability so that it is impossible to know that the multiple signature values have been generated by one signer.

The DAA technique is an anonymous authentication method that enables remote authentication of a device to protect the privacy of a device user, and provides user-controlled linkability. The user-controlled linkability refers to a characteristic in which a user can determine the possibility of linking a signature by using fixed tag information called a basename.

All of the above techniques are designed for pure anonymity and do not provide the ability to verify who the signer is. Therefore, its usability is limited in privacy protection applications where accountability or non-repudiation are required.

As one of the representative cryptographic authentication techniques for privacy with accountability, the group signature method is known. The group signature method basically does not expose the identity information or the identity identifier of the signer from the signature value. That is, the signature proves that a user of the group member has created the signature for the message. In addition, the group signature method provides unlinkability so that it is impossible to know that the multiple signature values have been generated by the same signer when the multiple signature values are given. The group signatures provide controllable anonymity for accountability. The controllable anonymity refers to the ability to verify the identifier of the signer when an opening key is given. For example, the controllable anonymity can be used to impose liability when a problem with the signature act occurs or to provide benefits to the signer through signer proof. However, it has a dichotomous structure that hides/exposes only the identifier of the signer, and deals with fragmentary anonymity. Therefore, in terms of service provision, it is not easy to achieve the original purpose obtained from service provision only with simple anonymity control, and thus, usage is limited in an actual application environment.

Recently, a group signature for providing controllable linkability by an extending group signature method that provides simple controllable anonymity has been suggested. The controllable linkability refers to the ability to verify that signature values are linked to each other when a special linking key is given. That is, it can be confirmed that signature values are generated by the same signer or the same signer key. Using this characteristic, a service provider can provide various anonymity-based services while maintaining the anonymity of the identity information, that is, without exposing the identity identifier. For example, in the case of a web-based personalized anonymous authentication service or data mining, useful information may be provided by analyzing anonymous authentication data without exposing users.

However, all of the group signature techniques described above have a limitation in that only a single identifier can be hidden/disclosed. Therefore, it is difficult to meet the requirements for the verification of various attributes in the current intelligent and advanced information and communication technology (ICT) applications. The personal identity information consists of a set of various pieces of attribute information such as name, date of birth, gender, address, credit card information, and education, and the combination of the various attributes is used as personal information according to application fields such as healthcare, social, education, work, hobbies, and e-commerce. At this time, an authentication system with controllable privacy that can prevent misuse of personal information, protect user privacy by providing only necessary attribute information according to application, and properly impose accountability is highly needed.

SUMMARY OF THE INVENTION

The present invention has been made in an effort to provide an anonymous credential authentication system and method thereof for preventing misuse of personal information, protecting user privacy by providing only necessary attribute information according to application, and properly imposing accountability.

According to an embodiment of the present invention, a method for authenticating in an anonymous credential authentication system is provided. The method for authenticating in an anonymous credential authentication system includes: receiving an anonymous credential signature value indicating that setting proposition information using a credential is satisfied from a user device that has been issued the credential combined with multiple pieces of attribute information constituting personal information; and generating and outputting signer authentication information that confirms a signer of the anonymous credential signature value using an opening key.

The method for authenticating in an anonymous credential authentication system may further include verifying the signer authentication information.

The method for authenticating in an anonymous credential authentication system may further include verifying validity of the anonymous credential signature value.

The verifying validity of the anonymous credential signature value may include: receiving the proposition information, the credential, and the anonymous credential signature value from the user device; classifying the attribute information combined with the credential into hidden attribute information, direct disclosure attribute information, and attribute information related to a setting function; performing basic verification on the anonymous credential signature value; and verifying the classified attribute information, respectively, when the basic verification is successful.

The generating and outputting may include: receiving the anonymous credential signature value for the proposition information; calculating a signature value of an issuer using the opening key and the anonymous credential signature value; obtaining user registration information from a user registration list using the signature value of an issuer; and generating the signer authentication information by using the user registration information and values included in the anonymous credential signature value.

The method for authenticating in an anonymous credential authentication system may further include, if two anonymous credential signature values generated by the user device are given, checking whether the two anonymous credential signature values are linked to each other using a linking key.

The method for authenticating in an anonymous credential authentication system may further include: generating a first public parameter associated with the opening key and a second public parameter associated with the linking key; generating a system public key including the first public parameter and the second public parameter; and issuing the credential in response to the system public key.

The method for authenticating in an anonymous credential authentication system may further include publishing the system public key.

The issuing may include: receiving, from the user device, a credential issuance request message including a commitment value for the multiple pieces of attribute information, a zero knowledge proof value for the commitment value, and a user signature value for the commitment value; verifying validity of the zero-knowledge proof value and the user signature value; calculating a signature value of an issuer using random values selected from an integer set representing the multiple pieces of attribute information, the system public key, the issuing key, and the commitment value; and issuing the credential including the random values and the signature value of the issuer to the user device.

The issuing may further include adding user registration information including the credential issued to the user device, the commitment value, the zero-knowledge proof value, and the user signature value to a user registration list.

According to another exemplary embodiment of the present invention, a method for authentication of an anonymous credential authentication system in a user device is provided. The method for authentication in the user device includes: transmitting, to a credential issuance server, a credential issuance request message including multiple pieces of attribute information constituting personal information, a commitment value for the multiple pieces of attribute information, a zero knowledge proof value for the commitment value, and a user signature value for the commitment value; getting a credential including a signature value of the credential issuing server generated by using an issuing key and random values selected from an integer set representing the multiple pieces of attribute information issued from the credential issuing server; generating an attribute authentication signature key by combining a system public key published by the credential issuing server, the credential, and the multiple pieces of attribute information; presenting an anonymous credential signature value indicating that the proposition information set is satisfied using the credential and the attribute authentication signature key; and receiving a verification result for the anonymous credential signature value.

The system public key may include at least one of a first public parameter providing a signer authentication and a second public parameter providing a linking check between two signature values.

The presenting may include: generating a value providing the signer authentication using the first public parameter and the signature value of the credential issuing server; calculating a proof value that proves each piece of attribute information; generating a zero-knowledge proof value for qualification requirements among the proposition information; and generating an anonymous credential signature value including at least the proof value, the value providing the signer authentication, the zero-knowledge proof value, and the multiple pieces of attribute information.

The presenting may include: generating a value providing the linking check by using the second public parameter; calculating a proof value that proves each piece of attribute information; generating a zero-knowledge proof value for qualification requirements among the proposition information; and generating an anonymous credential signature value including at least the proof value, the value providing the linking check, the zero-knowledge proof value, and the multiple pieces of attribute information.

According to another exemplary embodiment of the present invention, an anonymous credential authentication system for authenticating a user using an anonymous credential method is provided. The anonymous credential authentication system includes a credential issuing server and an opening server. The credential issuing server issues a credential combined with multiple pieces of attribute information constituting personal information in response to a system public key to the user. The opening server generates and outputs signer authentication information for confirming a signer of an anonymous credential signature value when the anonymous credential signature value indicating that setting proposition information set is satisfied using the credential from the user who is issued the credential is received.

The anonymous credential authentication system may further include a signature verification server that classifies the attribute information combined with the credential into hidden attribute information, direct disclosure attribute information, and attribute information related to a setting function, performs basic verification on the anonymous credential signature value, and then verifies validity of the anonymous credential signature value by verifying the classified attribute information, respectively.

The anonymous credential authentication system may further include a signer identification server that verifies the validity of the signer authentication information according to a verification request of the signer authentication information.

The anonymous credential authentication system may further include a linking server that checks whether two anonymous credential signature values are linked to each other using a linking key user when the two anonymous credential signature values generated by the user are given.

The system public key may include at least one of a first public parameter providing a signer authentication and a second public parameter providing a linking check between two anonymous credential signature values.

When a credential issuance request message including a commitment value for the multiple pieces of attribute information, a zero knowledge proof value for the commitment value, and a user signature value for the commitment value is received from the user, the credential issuing server may calculate a signature value of the credential issuing server using random values selected from an integer set representing the multiple pieces of attribute information, the system public key, the issuing key, and the commitment value, and may generate the credential including the random values and the signature value of the credential issuing server.

DETAILED DESCRIPTION OF THE EMBODIMENTS

Figure 1:
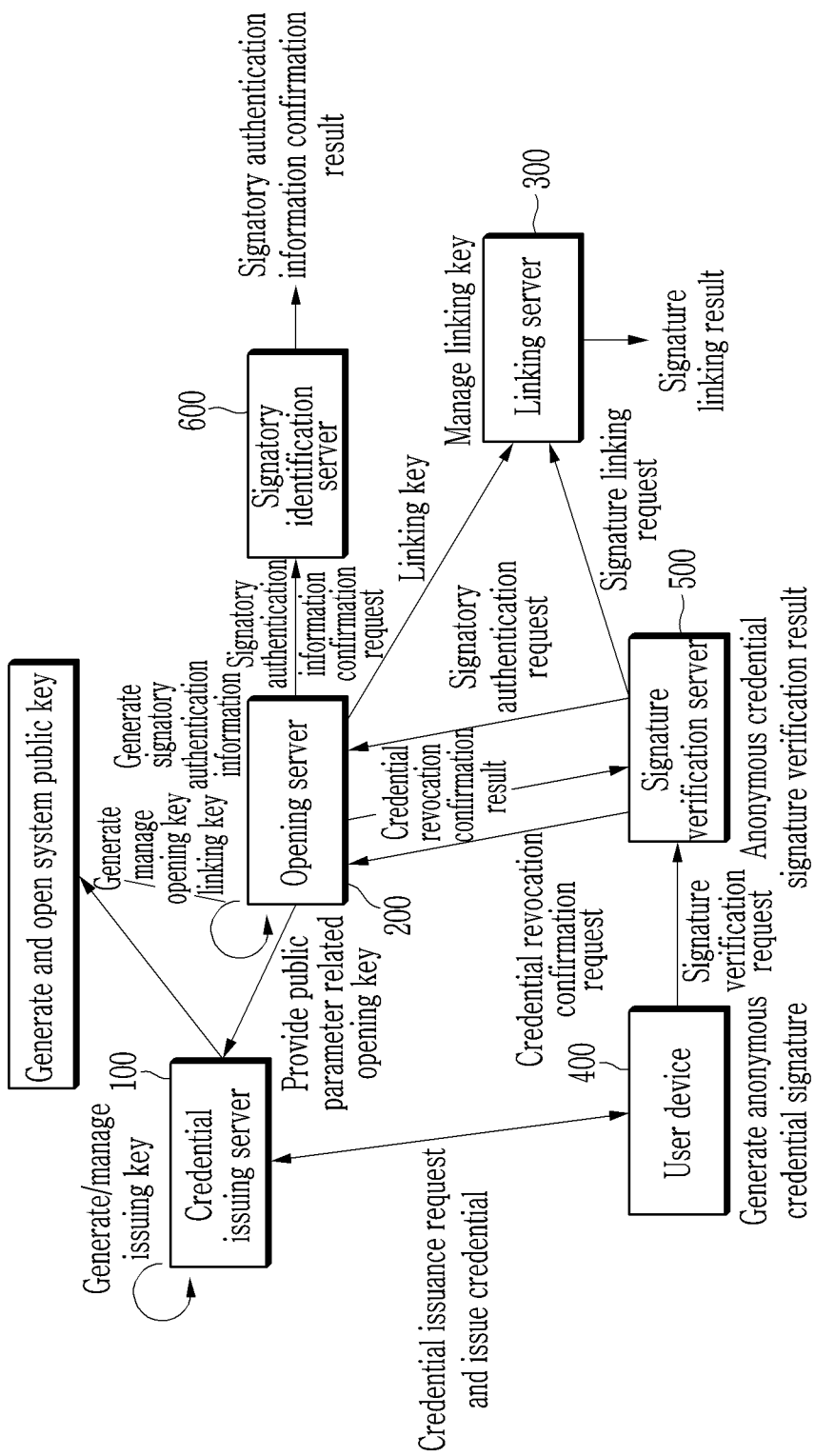
FIG. 1 is a diagram illustrating the configuration of an anonymous credential authentication system according to an embodiment of the present invention.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, an anonymous credential authentication system and method thereof according to embodiments of the present invention will be described in detail with reference to the accompanying drawings.

FIG. 1 is a diagram illustrating the configuration of an anonymous credential authentication system according to an embodiment of the present invention.

Referring to FIG. 1, the anonymous credential authentication system includes a credential issuing server 100, an opening server 200, a linking server 300, and a user device 400, a signature verification server 500, and a signer identification server 600. The configuration of the anonymous credential authentication system is not limited to this, and the roles of the components can be flexibly separated or integrated according to the design method, and if necessary, a new component can be defined for interworking with a known real name authentication method. For example, the credential issuing server 100 and the opening server 200 may be integrated, or the opening server 200 and the linking server 300 may be integrated. Alternatively, the opening server 200, the linking server 300, the signature verification server 500, and the signer identification server 600 may be integrated.

In addition, the credential issuing server 100, the opening server 200, the linking server 300, the signature verification server 500, and the signer identification server 600 may perform the functions described below by a processor, respectively. The processor may be implemented as a central processing unit (CPU), another chipset, or a microprocessor. The processor may control an operation for the corresponding function to be performed by loading a program command for implementing the function into a memory. Furthermore, the credential issuing server 100, the opening server 200, the linking server 300, the signature verification server 500, and the signer identification server 600 may further include an input/output interface for transmitting and receiving data to and from the outside.

The credential issuing server 100, the opening server 200, and the linking server 300 correspond to trusted entities.

The credential issuing server 100 generates a system public key in cooperation with the opening server 200 and the linking server 300 initially or when necessary.

The credential issuing server 100 publishes the system public key to all components 200 to 600 in the anonymous credential authentication system.

Upon receiving the credential issuance request message from the user device 400, the credential issuing server 100 performs an interactive protocol with the user device 400, and then generates an issuing key using the system public key and issues a credential combined with multiple pieces of attribute information of the user using the issuing key to the user device 400. The credential issuance request message may include a commitment value for attribute information and a private key, the related knowledge (or zero-knowledge) proof value about possession of a corresponding attribute information and private key, a message warranting the user who requested the issuance of credential, and the like. Secure channels for authentication may be established between the credential issuing server 100 and the user device 400.

The credential issuing server 100 manages user registration information including the issuing key and the issued credential.

The opening server 200 generates and manages an opening key using the system public key. In addition, the opening server 200 generates a linking key using the system public key and transmits the generated linking key to the linking server 300. When a valid anonymous credential signature value is given, the opening server 200 generates and outputs signer identification information capable of verifying who the signer is by using the opening key. Anyone can publicly check the outputted signer identification information.

The linking server 300 manages the linking key. When two valid anonymous credential signature values are given, the linking server 300 outputs a signature link result whether they are linked to each other using the linking key, that is, whether two anonymous credential signature values are generated by one signer.

The user device 400 generates an anonymous credential signature value by using the credential issued from the credential issuing server 100.

The signature verification server 500 verifies the validity of the given anonymous credential signature value.

The signer authentication server 600 verifies the validity of the signer authentication information generated from the opening server 200.

Figure 2:
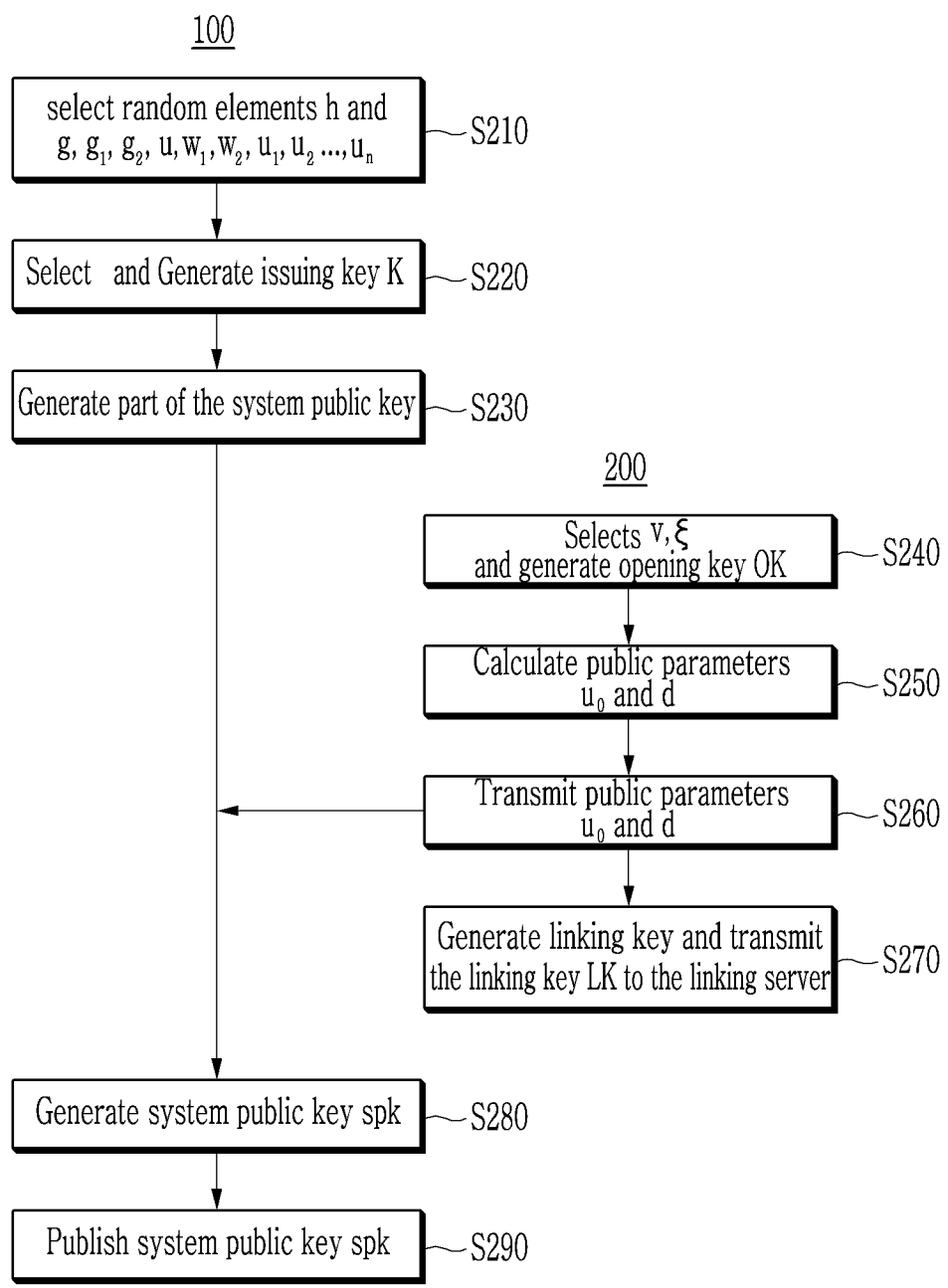
FIG. 2 is a diagram illustrating a method of generating a system public key, an issuing key, an opening key, and a linking key corresponding to the system public key in a credential issuing server according to an embodiment of the present invention.

FIG. 2 is a diagram illustrating a method of generating a system public key, an issuing key, an opening key, and a linking key corresponding to the system public key in a credential issuing server according to an embodiment of the present invention.

Referring to FIG. 2, the credential issuing server 100 initially receives a security parameter k as an input, and first, generates a bilinear group pair $(G_1, G_2)$, a bilinear map e, and a hash function H combined with the bilinear group pair $(G_1, G_2)$. The bilinear map e and the hash function H maybe generated as in Equations 1 and 2, respectively.

$$e: G_1 \times G_2 \rightarrow G_T \quad \text{(Equation 1)}$$

$$H: \{0,1\} \rightarrow Z_p^* \quad \text{(Equation 2)}$$

Here, the order of the groups is called the prime p, and $Z_p^*$ denotes a set of integers from 1 to (p−1).

The credential issuing server 100 performs the following operation to generate parameters according to the anonymous credential authentication system, The credential issuing server 100 selects a random elements
$h \in G_2$ and
$g, g_1, g_2, u, w_0, w_1, u_1, u_2 \ldots, u_n \in G_1$
(S210), and generates an issuing key K by selecting a random $\theta \in Z_p^*$ (S220), then calculates $h_\theta = h^\theta$ and generates a part of the system public key (S230). At this time, the issuing key IK may be defined as in Equation 3.

$$IK = \theta \quad \text{(Equation 3)}$$

The opening server 200 selects a random $v, \xi \in Z_p^*$ and generates an opening key OK (S240), calculates public parameters $u_0$ and d as in Equation 4 (S250), and then transmits it to the credential issuing server 100 (S260). At this time, the opening key OK may be defined as in Equation 5.

$$u_0 = u^v d = u^\xi \quad \text{(Equation 4)}$$

$$OK = (v, \xi) \quad \text{(Equation 5)}$$

In addition, the opening server 200 generates a linking key LK as shown in Equation 6 and transmits the linking key LK to the linking server 300 (S270).

$$LK = h^{-\xi} \quad \text{(Equation 6)}$$

In this case, since the credential issuing server 100 does not know the opening key information, the signer authentication authority may be distributed.

In addition, by configuring the operation of the opening server 200 with multiple trusted entities and controlling the authority for the signer authentication using a secret distribution technique, the privacy of the signer may be enhanced. If a single entity has the opening key, it can misuse its authority. Accordingly, by dividing the opening key and allowing it to be managed by the multiple trusted entities, and reconfiguring the divided opening key if necessary, the privacy of the signer can be enhanced.

The credential issuing server 100 may selectively generate the opening key OK, the linking key LK, and public parameters $u_0$ and d, may transmit the opening key OK to the opening server 200, and may transmit the linking key LK to the linking server 300.

The credential issuing server 100 generates a system public key spk as shown in Equation 7 by including public parameters u0 and d received from the opening server 200 in the system public key spk (S280), and publishes the system public key spk so that it can be used publicly (S290).

$$spk = (e, G_1, G_2, G_T, g, g_1, g_2, u, d, w_0, w_1, u_0, u_1, \ldots, u_n, h_1, h_\theta, H) \quad \text{(Equation 7)}$$

Figure 3:
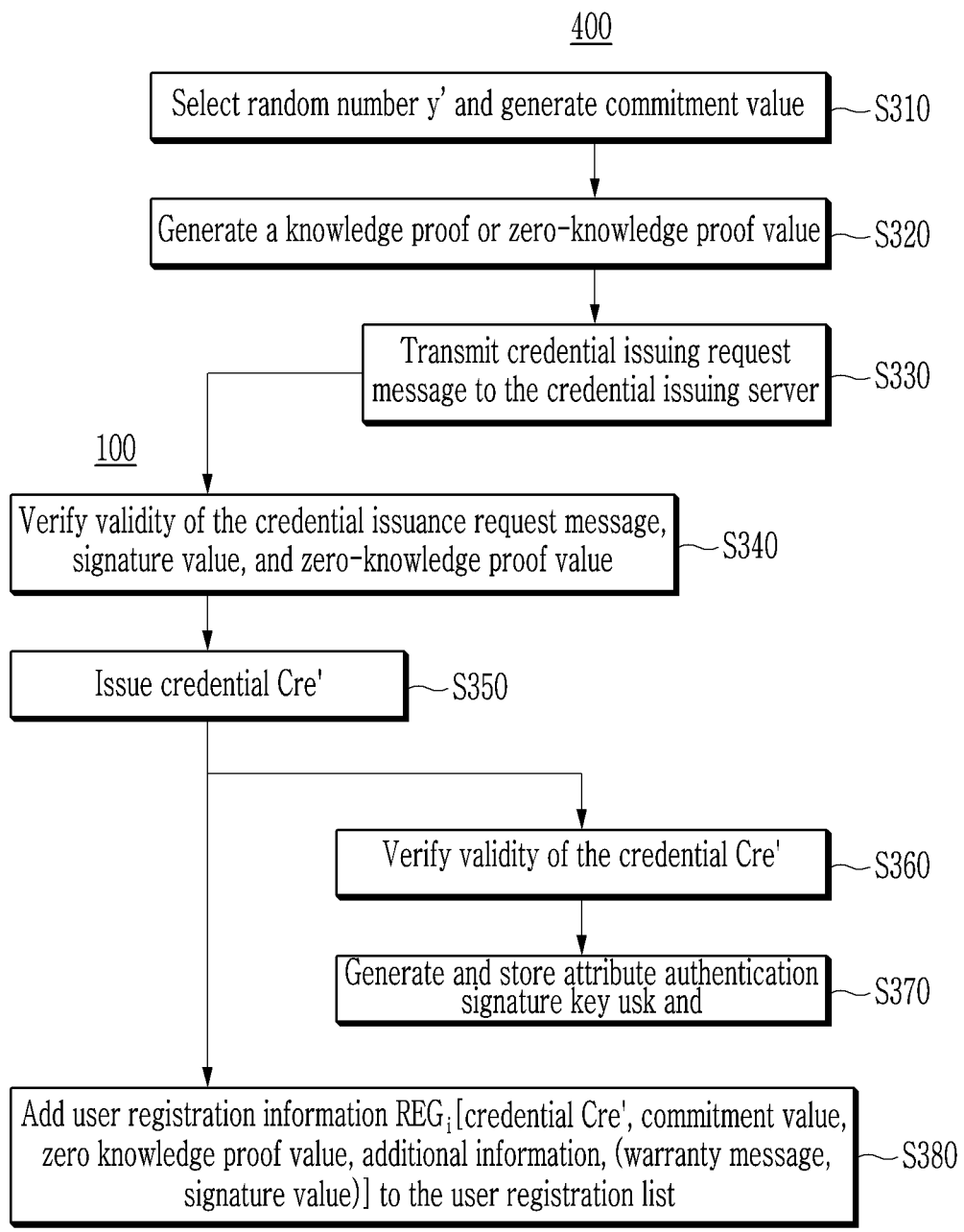
FIG. 3 is a diagram illustrating a method of mutually generating a credential with a user device in a credential issuing server according to an embodiment of the present invention.

FIG. 3 is a diagram illustrating a method of mutually generating a credential with a user device in a credential issuing server according to an embodiment of the present invention.

Referring to FIG. 3, the user device 400 and the credential issuing server 100 mutually perform the following operations according to the anonymous credential authentication system to be used. If necessary, an authentication and secure channels may be established between the user device 400 and the credential issuing server 100.

The user attributes are defined as $a_0, a_1, \ldots, a_n \in Z_p^*$. Various attribute information can be combined and defined depend on the service. For example, $a_0$ may be defined as a private key, $a_1$ may be defined as a name, $a_2$ may be defined as a date of birth, $a_3$ may be defined as a gender, and the like. For another example, $a_0$ may be defined as a private key 1, $a_1$ may be defined as a private key 2, $a_2$ may be defined as a name, $a_3$ may be defined as card information 1, and $a_4$ may be defined as financial information. Each attribute may be encoded by a separately determined encoding method and converted into an integer form between 0 and a decimal p. In addition, some or all of the attributes may be shared by the credential issuing server 100 and the user device 400 according to an application. For example, when the credential issuing server 100 is a mobile communication company, the credential issuing server 100 and the user device 400 may share a mobile phone number or the like. In addition, when the credential issuing server 100 is a financial company, the credential issuing server 100 and the user device 400 can share account information, etc., and when the credential issuing server 100 is a central/local government, the credential issuing server 100 and the user device 400 may share a resident registration number or address.

The user device 400 to be issued a credential selects a random number $y' \in Z_p^*$ for the attribute information $a_0$, $a_1, \ldots, a_n$ of a user and generates a commitment value F as shown in Equation 8 (S310).

$$F = g_2^{y'} \prod_{i=0}^{n} u_i^{a_i} \quad \text{(Equation 8)}$$

The user device 400 generates a knowledge proof or zero-knowledge proof value ZK-PF as shown in Equation 9 (S320). The knowledge proof or zero-knowledge proof value ZK-PF proves that the user device knows the random number y' and attribute information $a_0, a_1, \ldots, a_n$ for the commitment value F.

$$ZK\text{-}PF(g_2, u_0, \ldots, u_n; F) \quad \text{(Equation 9)}$$

The user device 400 transmits the credential issuing request message Req_Cred to the credential issuing server 100 (S330).

At this time, the user device 400 provides the commitment value F, the related zero-knowledge proof value ZK-PF, the warranty message warr warranting the user who requested the issuance of a credential, and the signature value S for the warranty message warr and the commitment value F through the credential issuance request message Req_Cred to the credential issuing server 100.

The credential issuing server 100 verifies whether the credential issuance request message Req_Cred, the signature value S, and the zero-knowledge proof value ZK-PF are valid (S340).

If all verifications are successful, the credential issuing server 100 selects a random value $\mu, y'' \in Z_p^*$, and calculates a signature value A of the credential issuing server 100, which is a partial value of the credential to be issued using the issuing key $\theta$ and the commitment value F as in Equation 10.

$$A = (g_1 g_2^{y''} F)^{1/(\theta + \mu)} \quad \text{(Equation 10)}$$

Next, the credential issuing server 100 generates a credential Cre' as shown in Equation 11, and issues the credential Cre' to the user device 400 (S350).

$$Cre' = (A, \mu, y'') \quad \text{(Equation 11)}$$

In the issuing process, the credential issuing server 100 may additionally add attribute information or modify attribute information according to a predetermined policy. For example, the credential issuing server 100 multiplies the commitment value F by $u_i^{c_i}$ and changes the initial i-th attribute value $a_i$ to a new attribute value $a_i + c_i (\bmod p)$, and then calculates the signature value A of the credential issuing server 100 as shown in 12, and issues a credential Cre' to the user device 400.

$$A = (g_1 g_2^{y''} (F u_i^{c_i}))^{1/(\theta + \mu)} \quad \text{(Equation 12)}$$

In this case, the credential issuing server 100 may inform the change of attribute information to the user device 400, and may provide a value $c_i(\bmod p)$ used for the change to the user device 400. For another example, if the i-th attribute value of the commitment value F is not defined, similarly to the above, the i-th attribute value is defined as ci by multiplying the commitment value F by $u_i^{c_i}$, and then the credential Cre' may be provided to the user device 400.

After receiving the credential Cre' from the credential issuing server 100, the user device 400 verifies the validity of the credential Cre' (S360). The user device 400 may verify the validity of the credential Cre' by calculating $t_1$ and $t_2$ as in Equation 13 and then checking whether $t_1$ and $t_2$ are the same values.

$$t_1 = e(A, h_0 h^\mu) \quad t_2 = e(g_1 g_2^{y''} F, h) \quad \text{(Equation 13)}$$

If $t_1$ and $t_2$ are the same value, the user device 400 calculates y as in Equation 14, generates an attribute authentication signature key usk corresponding to the complete credential as in Equation 15, and safely stores the attribute authentication signature key usk (S370).

$$y = y' + y'' \quad \text{(Equation 14)}$$

$$usk := (a_0, a_1, \ldots, a_m, (A, \mu, y)) \quad \text{(Equation 15)}$$

The credential issuing server 100 adds user registration information $REG_i$ [credential Cre', commitment value F, zero knowledge proof value ZK-PF, additional information, (warranty message warr, signature value S)] to the user registration list REG (S390). Here, the additional information may include, for example, attribute values additionally defined by the credential issuing server 100 at the time of issuance.

The above methods can support simultaneous subscription by using the non-interactive zero-knowledge proof of knowledge method.

Figure 4:
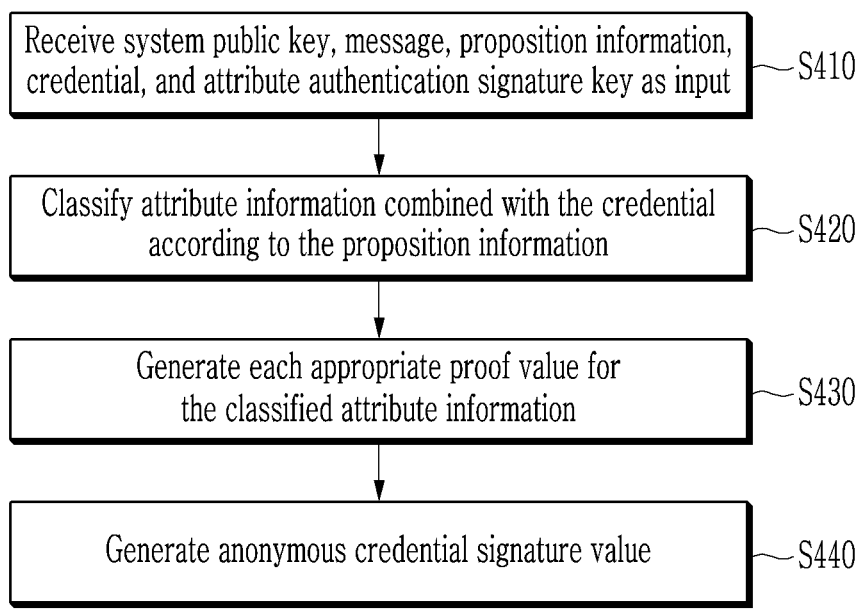
FIG. 4 is a diagram illustrating a method for generating and presenting an anonymous credential signature for a given message by a user device according to an embodiment of the present invention.

FIG. 4 is a diagram illustrating a method for generating and presenting an anonymous credential signature for a given message by a user device according to an embodiment of the present invention.

Referring to FIG. 4, the user device 400 receives the system public key spk, a message M, proposition information QI, the credential Cre', and a corresponding attribute authentication signature key usk as input (S410). The user device 400 may read the credential Cre' and the attribute authentication signature key usk corresponding thereto from the storage.

The user device 400 generates an anonymous credential signature value a for input as follows.

Specifically, the user device 400 classifies the attribute information combined with the credential Cre' according to the proposition information QI into hidden attribute information, direct disclosure attribute information, and attribute information related to a certain function (e.g., range proof), and the like (S420).

For convenience of explanation, it is assumed that the entire attribute information consists of 11 items such as "a0, a1, . . . ,a10", and the attributes are defined as '$a_0$=secret key', '$a_1$=name', '$a_2$=date of birth', '$a_3$=gender', '$a_4$=address-postcode', ' $a_5$=address-city', '$a_6$=address-detail', '$a_7$=mobile phone number', '$a_5$=credit card-issuer', '$a_9$=credit card-16 digit number', and '$a_{10}$=credit card-expiration date'.

The proposition information QI represents a criterion that attributes should be satisfied. For example, when it is necessary to prove that the user is an adult, the proposition information QI may indicate "age>18". Hereinafter, for clarity of explanation, the proposition information QI will be described through examples. Additional sets may be defined as shown in Table 1 to indicate the proposition information QI.

TABLE 1

| Additional sets | Explanation |
| --- | --- |
| HIX (Hidden Index) | Set of hided attribute indices |
| DIX (Disclosed Index) | Set of disclosed attribute indices |
| RIX (Range Index) | Set of attribute indices that are range-proven |
| RIF (Range Information) | Set of range information for range proof |

When HIX={0, 1, 3, 4, 6, 7, 8, 9, 10}, DIX={5}, RIX={2}, RIF={(2:18,200)}, the proposition information QI indicates that "$a_0, a_1, a_3, a_4, a_6, a_7, a_8, a_9, a_{10}$" among the attributes are hidden, "$a_5$=Seoul City" is directly exposed, and "$a_2$=date of birth=19800101" is used for range proof [18<age (=present year month day−$a_2$)<200] in order to optional disclose for privacy protection. For example, at a Seoul wine event where discounts are provided for citizens of Seoul and adults (over 18 years of age), the user presents an anonymous credential signature value that satisfies the proposition information QI=(HIX, DIX, RIX, RIF) to receive the discount. Here, only the range proof is described, but it can be defined for various arithmetic functions or predicate functions.

Next, the user device 400 first selects a random number $\alpha \in Z_p^*$, and calculates $\gamma$, $D_1$, $D_2$, and $D_3$ corresponding to a part of the anonymous credential signature value as shown in Equation 16.

$$y=\alpha\mu+z(\bmod p) \quad D_1=u^\alpha D_2=Au_0^\alpha D_3=g^y d^\alpha \qquad \text{(Equation 16)}$$

In addition, the user device 400 selects random numbers $r_\alpha, r_\mu, r_\gamma, r_1, \ldots, r_m \varepsilon Z_p^*$ and calculates median values $R_1$, $R_2$, and $R_3$ for generating anonymous credential signature value as shown in Equation 17.

$$R_1 = u^{r_\alpha} \qquad \text{(Equation 17)}$$

$$R_2 = e(D_2, h)^{r_\mu} e(u_0, h_\theta)^{r_\alpha} e(u_0, h)^{r_\gamma} \sum_{i \in HIX \cup RIX} e(u_i, h)^{r_i}$$

$$R_3 = g^{r_\gamma} d^{r_\alpha}$$

In addition, the user device 400 calculates c using the hash function as shown in Equation 18, and calculates $S_\alpha, S_\mu, S_\gamma, S_y$ corresponding to a part of the anonymous credential signature value as shown in Equation 19.

$$c=H(M, spk, D_1, D_2, D_3, R_1, R_2, R_3) \qquad \text{(Equation 18)}$$

$$S_\alpha=r_\alpha-c\alpha(\bmod p) \ S_\mu=r_\mu+c\mu(\bmod p) \ S_\gamma=r_\gamma-c\gamma(\bmod p)$$
$$S_y=r_y-cy(\bmod p) \qquad \text{(Equation 19)}$$

The user device 400 calculates a value $s_i$ proving each attribute for all indices i (i=0, 1, 2, 3, 4, 6, 7, 8, 9, 10) belonging to HIX and RIX as shown in Equation 20.

$$S_i=r_i-c\alpha_i(\bmod p) \qquad \text{(Equation 20)}$$

The user device 400 defines $s_j=a_j$, that is, a value for proving a corresponding attribute as an original attribute value for all indices j (for example, j=5) belonging to DIX. In addition, the user device 400 generates a zero-knowledge proof value $\pi_{range}$ for range proof for all indices k (for example, k=2) belonging to RIX. Considering the proposition information QI given as an example above, the zero-knowledge proof value $\pi_{range}$ can be consisted only of $\pi_2[18,200]$. For convenience, $\pi_2[18,200]$ is expressed as a zero-knowledge proof value for a range proof [18<age (=present year month day−$a_2$)<200] about $a_2$.

In this way, the user device 400 generates each appropriate proof value $s_i$ for the classified attribute information (S430).

Finally, the user device 400 generates an anonymous credential signature value σ as shown in Equation 21, and outputs the anonymous credential signature value σ (S440).

$$\sigma=(D_1, D_2, D_3, c, S_\alpha, S_\mu, S_\gamma, S_y, S_0, \ldots, S_{10}, \pi_{range}) \qquad \text{(Equation 21)}$$

In the process of generating an anonymous credential signature value σ, if the user device 400 wants to generate a signature for a service that does not require accountability that requires signer identification, the user device 400 can generate a signature using a random value $w_0$ instead $u_0=u^v$. In this case, the signer can remain hidden because the opening key OK cannot be applied. In addition, similarly, in order to disable the linking key LK and generate an anonymous credential signature value for which a signature linking function is not provided, the signature may be generated by using a random value $w_1$ instead $d=u^\xi$.

Figure 5:
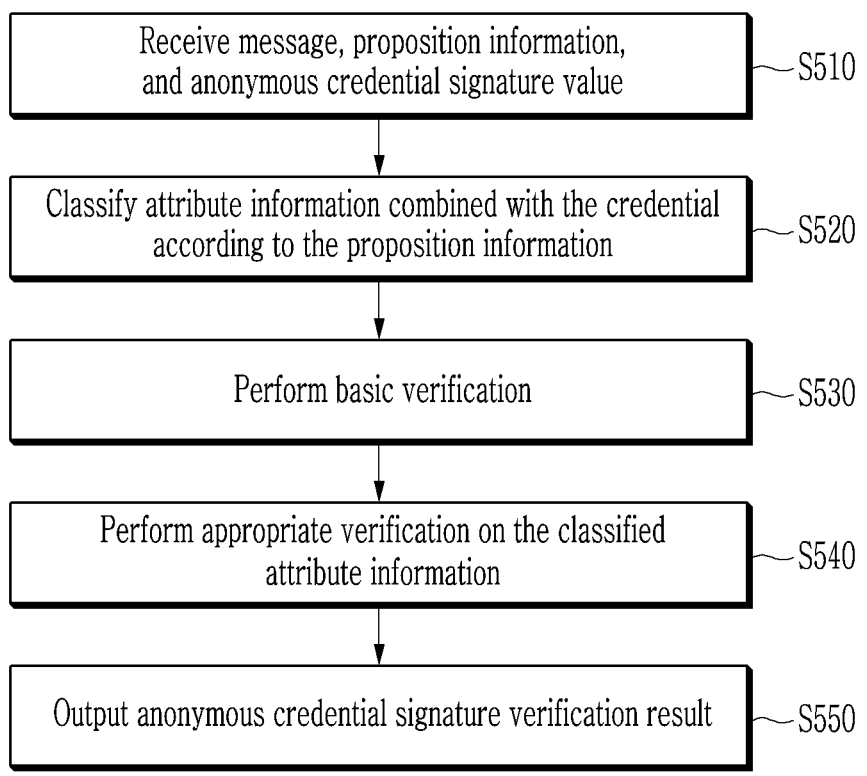
FIG. 5 is a diagram illustrating a method of verifying an anonymous credential signature value for a message and proposition information generated by a user device in a signature verification server according to an embodiment of the present invention.

FIG. 5 is a diagram illustrating a method of verifying an anonymous credential signature value for a message and proposition information generated by a user device in a signature verification server according to an embodiment of the present invention.

Referring to FIG. 5, the signature verification server 500 receives a message M, proposition information QI [=(HIX, DIX, RIX, RIF)], and an anonymous credential signature value σ as input from the user device 400 (8510).

The signature verification server 500 classifies the attribute information combined with the credential Cre' according to the proposition information QI into hidden attribute information, direct disclosure attribute information, attribute information related to a certain function (e.g., range proof), and the like (S520).

The signature verification server 500 performs basic verification of the given anonymous credential signature value σ (S530). For example, in order to perform basic verification on the anonymous credential signature value σ shown in Equation 21, the signature verification server 500 first calculates $R_1$, $R_2$, and $R_3$ as shown in Equation 22.

$$R_1 = u^{s_\alpha} D_1^c \qquad \text{(Equation 22)}$$

$$R_2 = e(D_2, h)s^{s_\mu} e(u_0, h^\theta)^{s_\alpha} e(u_0, h)^{s_y} e(g_2, h)^{s_y}$$

$$\sum_{i \in HIX \cup RIX} e(u_i, h)^{s_i} \left( e(D_2, h_\theta) \left( \sum_{i \in DIX} e(u_i, h)^{-s_i} \right) e(g_1, h)^{-1} \right)^c$$

$$R_3 = g^{s_y} d^{s_\alpha} D_3^c$$

The signature verification server 500 calculates the hash function value c' as shown in Equation 23, and then checks whether c included in the anonymous credential signature value σ and the calculated c' are the same.

$$c'=H(M, spk, D_1, D_2, D_3, R_1, R_2, R_3) \qquad \text{(Equation 23)}$$

If c and c' are the same, the signature verification server 500 performs appropriate verification on the classified attribute information (S540). That is, the signature verification server 500 proceeds to verify whether the attribute information satisfies the proposition information QI[=(HIX, DIX, RIX, RIF)]. The signature verification server 500 checks whether attribute values corresponding to all indices of the DIX satisfy a certain format. For example, the signature verification server 500 may verify whether the information "$a_5$=address-city" is an α-bit string (if necessary, it is one of city lists in Korea) and is the same as "Seoul". In addition, The signature verification server 500 verifies whether the zero-knowledge proof value $\pi_{range}$, that is, $\pi_2$[18,200], which is included in the anonymous credential signature value σ is zero-knowledge valid for range proof [18<age (=present year month day $-a_2$)<200].

The signature verification server 500 outputs an anonymous credential signature verification result (S550). If all anonymous credential signature verification results are valid, the signature verification server 500 may output 1 indicating that the given anonymous credential signature value σ is valid, and output 0 if not.

Figure 6:
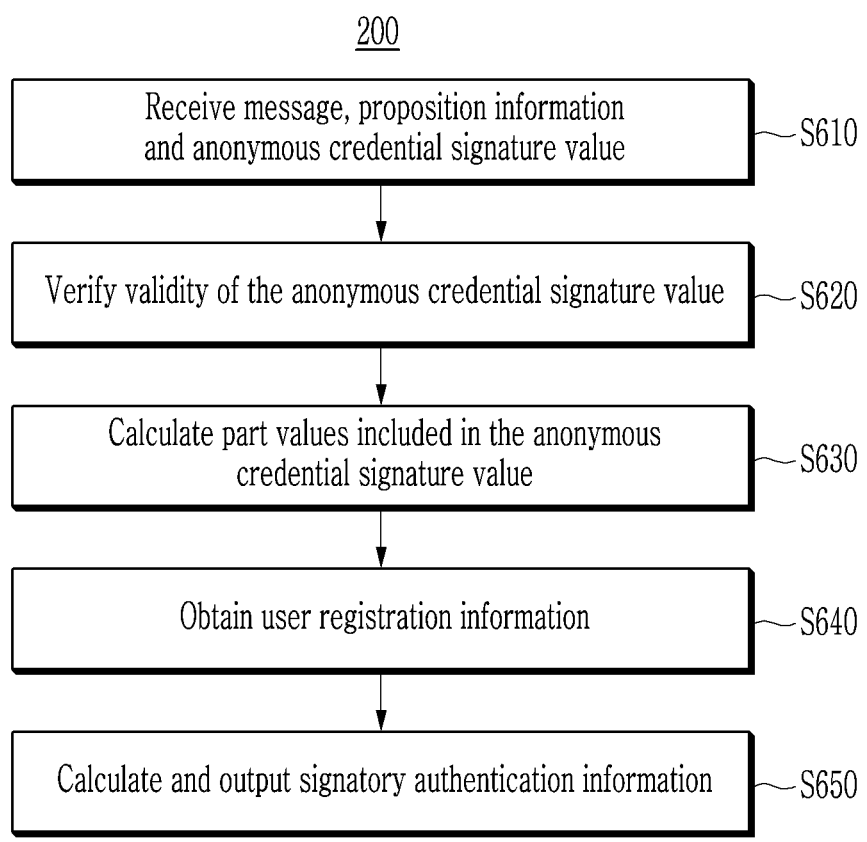
FIG. 6 is a diagram illustrating a method of generating signer authentication information in an opening server according to an embodiment of the present invention.

FIG. 6 is a diagram illustrating a method of generating signer authentication information in an opening server according to an embodiment of the present invention.

Referring to FIG. 6, the opening server 200 receives the message M, the proposition information QI, and the anonymous credential signature value σ for the proposition information QI as input (S610), and verifies the validity of the anonymous credential signature value σ (S620). The opening server 200 may receive a signature verification result for the anonymous credential signature value σ from the signature verification server 500, and verify the validity of the anonymous credential signature value σ from the signature verification result.

When the validity of the anonymous credential signature value σ is verified, the opening server 200 generates signer authentication information T.

Specifically, the opening server 200 calculates K and A included in the anonymous credential signature value σ as shown in Equation 24 and Equation 25 using the opening key OK (S630).

$$K=D_1^v \quad \text{(Equation 24)}$$

$$A=D_2K^{-1} \quad \text{(Equation 25)}$$

The opening server 200 obtains user registration information $REG_i$ [credential Cre', commitment value F, zero knowledge proof value ZK-PF, additional information, (warranty message warr, signature value S)] in the user registration list REG through binary search using the calculated A (S640). At this time, if necessary, the opening server 200 may cooperate with the credential issuing server 100.

The opening server 200 generates a message $M_{open}$ for signer authentication processing including the message M and the proposition information QI, the anonymous credential signature value σ, the system public key, etc., selects a random number $r\in Z_p^*$, and then calculates $C_{open}$ and $S_{open}$ as shown in Equation 26 and Equation 27, respectively.

$$C_{open}=H(M_{open},K,u^r,D_1^r) \quad \text{(Equation 26)}$$

$$S_{open}=r-C_{open}v \quad \text{(Equation 27)}$$

Next, the opening server 200 calculates and outputs the signer authentication information T corresponding to the anonymous credential signature value σ as shown in Equation 28 (S650).

$$T=(K,S_{open},C_{open},(\mu,y'',F),(warrent,S)) \quad \text{(Equation 28)}$$

Figure 7:
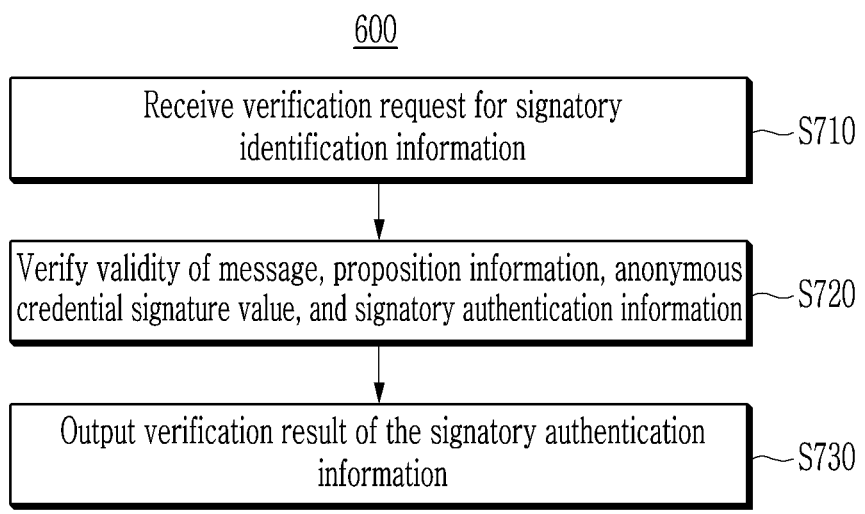
FIG. 7 is a diagram illustrating a method of verifying validity of signer identification information in a signer identification server according to an embodiment of the present invention.

FIG. 7 is a diagram illustrating a method of verifying validity of signer identification information in a signer identification server according to an embodiment of the present invention.

Referring to FIG. 7, the signer identification server 600 receives a verification request for a message M and proposition information QI, a valid anonymous credential signature value σ, and signer identification information T from the opening server 200 (S710).

The signer identification server 600 verifies the validity of the message M and the proposition information QI, the valid anonymous credential signature value σ, and the signer authentication information T as follows (S720).

The signer identification server 600 calculates $W_1$, $W_2$, and hash function value $C_{open}'$ as shown in Equation 29.

$$W_1=u^{S_{open}}u_0^{C_{open}}=u^r W_2=D_1^{S_{open}}K^{C_{open}}=D_1^r C_{open}'=H(M_{open},K,W_1,W_2) \quad \text{(Equation 29)}$$

The signer identification server 600 checks whether the calculated $C_{open}'$ and $C_{open}$ included in the signer authentication information T are the same.

The signer identification server 600 calculates A as shown in Equation 30 and then checks whether the Equation 31 is satisfied.

$$A=D_2K^{-1} \quad \text{(Equation 30)}$$

$$e(A,h_0h^\mu)=e(g_1g_2^{y''}F,h) \quad \text{(Equation 31)}$$

Next, the signer identification server 600 verifies the commitment value F and the signature value S for the warrant message warr.

The signer identification server 600 outputs the verification result of the signer authentication information T according to whether $C_{open}'$ and $C_{open}$ are the same, whether the Equation 31 is satisfied, and whether the signature value S is verified (S730). The signer identification server 600 outputs 1 indicating that the signer authentication information T is valid if $C_{open}'$ and $C_{open}$ are the same, the Equation 31 is satisfied, and the verification of the signature value S is successful, and otherwise outputs 0.

Figure 8:
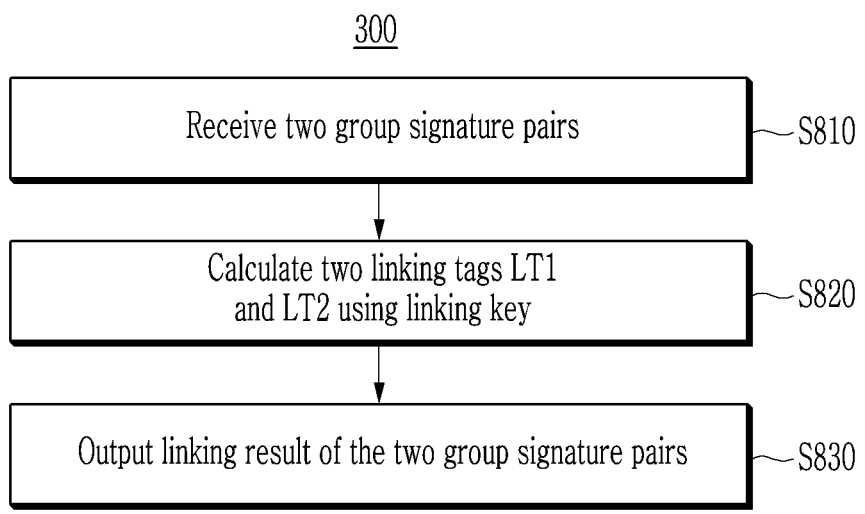
FIG. 8 is a diagram illustrating a method of checking whether two group signatures generated by a user device are linked to each other by using a linking key in a linking server according to an embodiment of the present invention.

FIG. 8 is a diagram illustrating a method of checking whether two group signatures generated by a user device are linked to each other by using a linking key in a linking server according to an embodiment of the present invention.

Referring to FIG. 8, the linking server 300 receives two group signature pairs [(M,QI,σ=($D_1$, $D_2$, $D_3$, . . . )), (M', QI',σ'=($D_1'$, $D_2'$, $D_3'$, . . . ))] as an input (S810). The group signature can consist of (message, proposition information, anonymous credential signature value).

The linking server 300 calculates two linking tags LT1 and LT2 as shown in Equation 32 and Equation 33 using the linking key (S820).

$$LT1=e(D_3,h_1)e(D_1,L)=e(g^y,h_1) \quad \text{(Equation 32)}$$

$$LT2=e(D_3',h_1)e(D_1',L)=e(g^{\bar{y}},h_1) \quad \text{(Equation 33)}$$

The linking server 300 compares LT1 and LT2 and outputs a linking result of the two group signature pairs (S830). If LT1 and LT2 are the same, the linking server 300 outputs 1 indicating linked, and outputs 0 indicating no link otherwise.

Figure 9:
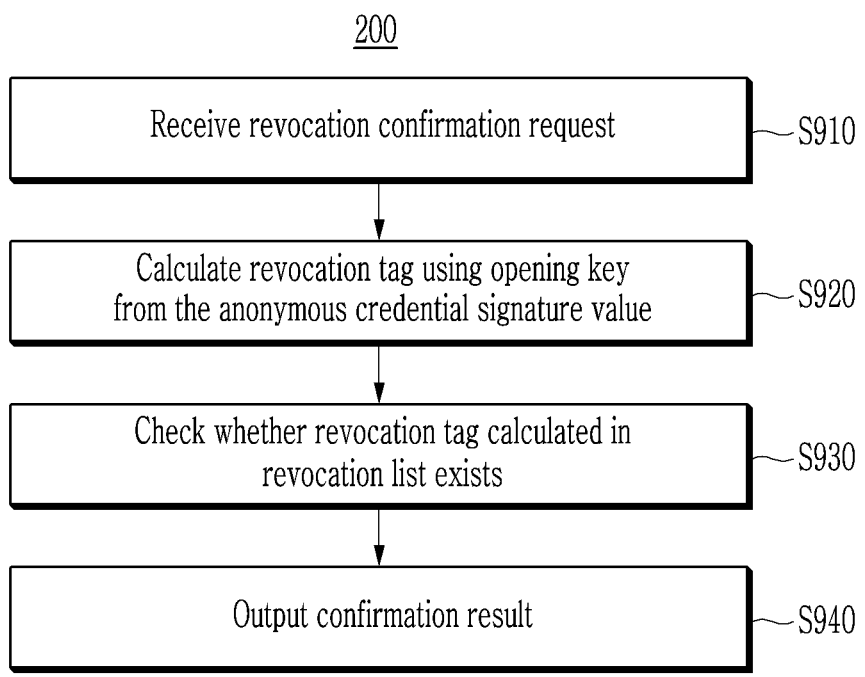
FIG. 9 is diagram illustrating a method of processing a revocation confirmation request by an opening server according to an embodiment of the present invention.

FIG. 9 is diagram illustrating a method of processing a revocation confirmation request by an opening server according to an embodiment of the present invention.

Referring to FIG. 9, the opening server 200 receives a revocation confirmation request (S910). The revocation confirmation request may include a message M and proposition information QI, credential Cre', and an anonymous credential signature value σ corresponding thereto.

The opening server 200 calculates a revocation tag RT using the opening key OK from the anonymous credential signature value σ (S920). Various revocation tag values can be calculated using the opening key OK. For example, the revocation tag RT may be calculated as shown in Equation 34.

$$RT = D_3 D_1^{-\xi} = g^y u^{\xi\alpha} \cdot (u^\alpha)^{-\xi} = g^y \qquad \text{(Equation 34)}$$

For another example, the linking tag value of FIG. 8 may be used as the revocation tag.

The opening server 200 checks whether the revocation tag value calculated in the revocation list exists (S930), and outputs the confirmation result (S940).

The opening server 200 may output 1 if there is a revocation tag value calculated from the revocation list, and output 0 otherwise.

That is, the opening server 200 generates a revocation tag using the corresponding information (credential Cre', corresponding anonymous credential signature value a) when requesting revocation, and registers the revocation tag in the revocation list. Thereafter, when requesting confirmation of revocation, as described above, after generating a revocation tag, the opening server 200 checks whether the revocation tag exists in the revocation list, and outputs the result.

According to an embodiment of the present invention, by providing a signature value based on anonymity that shows that the user satisfies the qualification requirements (proposition or standard) required in the application service by a user who has been issued a credential including various attribute information such as name, date of birth, gender, address, phone number, and payment (credit card) information provides, the exposure of personal information to the service provider is minimized, and the misuse of personal information may be prevented by providing the optional disclosure according to the service. In particular, it is expected to be highly available as an effective authentication system for self-sovereign identity along with distributed ledger technology or Blockchain technology.

In addition, according to an embodiment of the present invention, if necessary, it is possible to impose responsibility or provide signature linking information to hide the signer, and provide personalized customized service. When a user who authenticated based on anonymous credential denies a provided service, the system can identify the user using an opening key managed by a trusted third party or multiple joint management entities, and thereby can provide a non-repudiation function. Also, controllable anonymity and controllable linkability can be used for auditing.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for authenticating in an anonymous credential authentication system, the method comprising:
   receiving an anonymous credential signature value indicating that setting proposition information using a credential is satisfied from a user device that has been issued the credential combined with multiple pieces of attribute information constituting personal information;
   generating and outputting signer authentication information that confirms a signer of the anonymous credential signature value using an opening key; and
   checking whether two anonymous credential signature values are linked to each other using a linking key when the two anonymous credential signature values generated by the user device are given.

2. The method of claim 1, further comprising verifying the signer authentication information.

3. The method of claim 1, wherein further comprising verifying validity of the anonymous credential signature value.

4. The method of claim 3, wherein the verifying includes:
   receiving the proposition information, the credential, and the anonymous credential signature value from the user device;
   classifying the attribute information combined with the credential into hidden attribute information, direct disclosure attribute information, and attribute information related to a setting function;
   performing basic verification on the anonymous credential signature value; and
   verifying the classified attribute information, respectively, when the basic verification is successful.

5. The method of claim 1, wherein the generating and outputting includes:
   receiving the anonymous credential signature value for the proposition information;
   calculating a signature value of an issuer using the opening key and the anonymous credential signature value;
   obtaining user registration information from a user registration list using the signature value of an issuer; and
   generating the signer authentication information by using the user registration information and values included in the anonymous credential signature value.

6. The method of claim 1, further comprising:
   generating a first public parameter associated with the opening key and a second public parameter associated with the linking key;
   generating a system public key including the first public parameter and the second public parameter; and
   issuing the credential in response to the system public key.

7. The method of claim 6, further comprising publishing the system public key.

8. The method of claim 6, wherein the issuing includes:
   receiving, from the user device, a credential issuance request message including a commitment value for the multiple pieces of attribute information, a zero knowledge proof value for the commitment value, and a user signature value for the commitment value;
   verifying validity of the zero-knowledge proof value and the user signature value;
   calculating a signature value of an issuer using random values selected from an integer set representing the multiple pieces of attribute information, the system public key, the issuing key, and the commitment value; and
   issuing the credential including the random values and the signature value of the issuer to the user device.

9. The method of claim 8, wherein issuing further includes adding user registration information including the credential issued to the user device, the commitment value, the zero-knowledge proof value, and the user signature value to a user registration list.

10. A method for authentication of an anonymous credential authentication system in a user device, the method comprising:
    transmitting, to a credential issuance processor, a credential issuance request message including multiple pieces of attribute information constituting personal information, a commitment value for the multiple pieces of attribute information, a zero knowledge proof value for the commitment value, and a user signature value for the commitment value;
    getting a credential including a signature value of the credential issuing processor generated by using an issuing key and random values selected from an integer set representing the multiple pieces of attribute information issued from the credential issuing processor;
    generating an attribute authentication signature key by combining a system public key published by the credential issuing processor, the credential and the multiple pieces of attribute information;
    presenting an anonymous credential signature value indicating that a proposition information set is satisfied using the credential and the attribute authentication signature key; and
    receiving a verification result for the anonymous credential signature value,
    wherein the system public key includes at least one of a first public parameter providing a signer authentication and a second public parameter providing a linking check between two signature values, and
    wherein the presenting includes:
    generating a value providing the signer authentication using the first public parameter and the signature value of the credential issuing processor;
    calculating a proof value that proves each piece of attribute information; and
    generating a zero-knowledge proof value for qualification requirements among a proposition information.

11. The method of claim 10, wherein the presenting further includes:
generating an anonymous credential signature value including at least the proof value, the value providing the signer authentication, the zero-knowledge proof value, and the multiple pieces of attribute information.

12. The method of claim 10, wherein the presenting includes:
generating a value providing the linking check by using the second public parameter;
calculating a proof value that proves each piece of attribute information;
generating a zero-knowledge proof value for qualification requirements among a proposition information; and
generating an anonymous credential signature value including at least the proof value, the value providing the linking check, the zero-knowledge proof value, and the multiple pieces of attribute information.

13. An anonymous credential authentication system for authenticating a user using an anonymous credential method, the anonymous credential authentication system comprising:
a credential issuing processor that issues a credential combined with multiple pieces of attribute information constituting personal information in response to a system public key to the user;
an opening processor that generates and outputs signer authentication information for confirming a signer of an anonymous credential signature value when the anonymous credential signature value indicating that setting proposition information set is satisfied using the credential from the user who is issued the credential is received; and
a linking processor that checks whether two anonymous credential signature values are linked to each other by using a linking key when the two anonymous credential signature values generated by the user are given.

14. The anonymous credential authentication system of claim 13, further comprising a signature verification processor that classifies the attribute information combined with the credential into hidden attribute information, direct disclosure attribute information, and attribute information related to a setting function, performs basic verification on the anonymous credential signature value, and then verifies validity of the anonymous credential signature value by verifying the classified attribute information, respectively.

15. The anonymous credential authentication system of claim 13, further comprising a signer identification processor that verifies the validity of the signer authentication information according to a verification request of the signer authentication information.

16. The anonymous credential authentication system of claim 13, wherein the system public key includes at least one of a first public parameter providing a signer authentication and a second public parameter providing a linking check between two anonymous credential signature values.

17. The anonymous credential authentication system of claim 13, wherein when a credential issuance request message including a commitment value for the multiple pieces of attribute information, a zero knowledge proof value for the commitment value, and a user signature value for the commitment value is received from the user, the credential issuing processor that calculates a signature value of the credential issuing processor using random values selected from an integer set representing the multiple pieces of attribute information, the system public key, the issuing key, and the commitment value, and generates the credential including the random values and the signature value of the credential issuing processor.

\* \* \* \* \*